United States Patent
Nakajima et al.

(10) Patent No.: US 9,096,749 B2
(45) Date of Patent: Aug. 4, 2015

(54) PROPYLENE RESIN COMPOSITION AND INJECTION-MOLDED ARTICLE OF SAME

(71) Applicants: Sumitomo Chemical Company, Limited, Chuo-ku, Tokyo (JP); Toyota Jidosha Kabushiki Kaisha, Toyota-shi, Aichi-ken (JP)

(72) Inventors: Hiroyoshi Nakajima, Ichihara (JP); Toshio Watanabe, Toyota (JP); Shuji Nakagawa, Toyota (JP)

(73) Assignees: Sumitomo Chemical Company, Limited, Tokyo (JP); Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 13/848,107

(22) Filed: Mar. 21, 2013

(65) Prior Publication Data
US 2013/0253111 A1    Sep. 26, 2013

(30) Foreign Application Priority Data
Mar. 22, 2012  (JP) ................................. 2012-065668

(51) Int. Cl.
| C08L 23/16 | (2006.01) |
| C08L 23/12 | (2006.01) |
| C08K 5/14 | (2006.01) |
| B29C 45/00 | (2006.01) |

(52) U.S. Cl.
CPC ...................................... *C08L 23/12* (2013.01)

(58) Field of Classification Search
CPC ........... C08L 23/16; C08L 23/12; C08K 5/14; B29C 45/00; B29K 2023/12
USPC .................. 524/230, 232, 394, 528
See application file for complete search history.

(56) References Cited

U.S. PATENT DOCUMENTS

| 2009/0292060 | A1* | 11/2009 | Suzuki et al. ................. 524/505 |
| 2009/0326123 | A1* | 12/2009 | Nakajima et al. ............ 524/394 |

FOREIGN PATENT DOCUMENTS

| CN | 1434074 A | 8/2003 |
| CN | 101103054 A | 1/2008 |
| JP | 2001-288331 | * 10/2001 |
| JP | 2001-288331 A | 10/2001 |
| JP | 2003-286383 A | 10/2003 |
| JP | 2006-111864 A | 4/2006 |
| JP | 2006-225418 A | 8/2006 |
| JP | 2009-079117 A | 4/2009 |
| JP | 2012-241055 A | 12/2012 |
| WO | 2006075637 A1 | 7/2006 |

OTHER PUBLICATIONS

Office Action issued Jan. 27, 2015 in CN Application No. 201310089678.7.
Office Action issued May 14, 2015 in CN 201310089678.7.

* cited by examiner

*Primary Examiner* — James J Seidleck
*Assistant Examiner* — Deve E Valdez
(74) *Attorney, Agent, or Firm* — Panitch Schwarze Belisario & Nadel LLP

(57) ABSTRACT

A propylene resin composition contains a specific propylene resin (A), a specific copolymer (B), an inorganic filler (C), a fatty acid amide (D), and carbon black (E), wherein the propylene resin (A) has a content of 52% to 72% by weight, the copolymer (B) has a content of 10% to 20% by weight, and the inorganic filler (C) has a content of 18% to 28% by weight. The total of weights of the propylene resin (A), the copolymer (B) of ethylene and an α-olefin having not less than 4 carbons, and the inorganic filler (C) is taken as 100% by weight. The fatty acid amide (D) is contained at 0.2 to 0.7 parts by weight, and the carbon black (E) is contained at 0.8 to 2.2 parts by weight, relative to 100 parts by weight of the total of the weights of (A), (B) and (C).

8 Claims, No Drawings

PROPYLENE RESIN COMPOSITION AND INJECTION-MOLDED ARTICLE OF SAME

TECHNICAL FIELD

The present invention relates to a propylene resin composition and an injection-molded article of same.

BACKGROUND ART

Conventionally, molded articles obtained by molding propylene resin compositions are used as automobile components or consumer electrical product components. Such a propylene resin composition includes not only a propylene polymer but also a copolymer of ethylene and an α-olefin having not less than 4 carbons, an inorganic filler, etc.

For example, JP-A-2009-79117 discloses a polypropylene-based resin composition formed by formulating prescribed amounts of a polypropylene having a melt flow rate at 230° C. of 20 to 300 g/10 min., an ethylene/α-olefin copolymer or ethylene/α-olefin/diene copolymer having a melt flow rate at 230° C. of less than 0.4 g/10 min., an ethylene/α-olefin copolymer having a melt flow rate at 230° C. of not less than 0.5 g/10 min but less than 20 g/10 min, a modified polypropylene, and a surface-modifying agent.

Furthermore, JP-A-2003-286383 discloses a polypropylene-based resin composition including prescribed amounts of a propylene-ethylene block copolymer, a copolymer rubber of ethylene and an α-olefin having 3 to 20 carbons having a density 0.85 to 0.885 g/cm$^3$, an inorganic filler, and a fatty acid amide.

Moreover, JP-A-2006-111864 discloses a polypropylene-based resin composition including prescribed amounts of a propylene-ethylene block copolymer, a random copolymer rubber including a random copolymer rubber of ethylene and an α-olefin having 4 to 20 carbons having a density 0.85 to 0.885 g/cm$^3$ and a melt flow rate at 190° C. of not more than 5 g/10 min., and a random copolymer rubber of ethylene and an α-olefin having 4 to 20 carbons having a density 0.85 to 0.885 g/cm$^3$ and a melt flow rate at 190° C. of not less than 10 g/10 min., an inorganic filler, and a fatty acid amide.

DISCLOSURE OF THE INVENTION

It is an object of the present invention to provide an injection-molded article made of a propylene resin composition and having excellent scratch resistance, low surface gloss, and suppressed occurrence of flow marks, and a propylene resin composition useful as a material for such an injection-molded article.

The object of the present invention has been attained by means described below.

That is, the propylene resin composition related to the present invention comprises a propylene resin (A) defined below, a copolymer of ethylene and an α-olefin having not less than 4 carbons (B) defined below, an inorganic filler (C), a fatty acid amide (D), and carbon black (E), wherein the propylene resin (A) has a content of 52% to 72% by weight, the copolymer (B) of ethylene and an α-olefin having not less than 4 carbons has a content of 10% to 20% by weight, and the inorganic filler (C) has a content of 18% to 28% by weight, where the total of the weights of the propylene resin (A), the copolymer (B) of ethylene and an α-olefin having not less than 4 carbons, and the inorganic filler (C) is taken as 100% by weight, the fatty acid amide (D) is contained at 0.2 to 0.7 parts by weight, the carbon black (E) is contained at 0.8 to 2.2 parts by weight, relative to 100 parts by weight of the total of the weights of the propylene resin (A), the copolymer (B) of ethylene and an α-olefin having not less than 4 carbons, and the inorganic filler (C), propylene resin (A) is a propylene-based polymeric material (A-1) produced by multistage polymerization and comprising a propylene homopolymerized polymer component and a propylene-ethylene randomly copolymerized polymer component having an intrinsic viscosity number of 5 to 7 dl/g, or a mixture (A-3) comprising a propylene-based polymeric material (A-1) as defined above and a propylene homopolymer (A-2) having an intrinsic viscosity number of less than 1.5 dl/g;

copolymer (B) is a copolymer of ethylene and an α-olefin having not less than 4 carbons having a density of 0.850 to 0.870 g/cm$^3$ and a melt flow rate, measured at 190° C. under a load of 2.16 kgf in accordance with JIS K7210, of 0.1 to 10 g/10 min.

Furthermore, the injection-molded article of the present invention is an injection-molded article produced from the propylene resin composition of the present invention.

MODE FOR CARRYING OUT THE INVENTION

In the present specification, the propylene resin (A), copolymer (B) of ethylene and an α-olefin having not less than 4 carbons, inorganic filler (C), fatty acid amide (D), and carbon black (E) may be called simply Component (A), Component (B), Component (C), Component (D), and Component (E), respectively. Each of the components is explained below.

Propylene Resin (A)

The propylene resin composition of the present invention includes Component (A) at 52 to 72% by weight when the total of the weights of Component (A), Component (B), and Component (C) is taken as 100% by weight.

Furthermore, Component (A) is a propylene-based polymeric material (A-1) produced by multistage polymerization and including a propylene homopolymerized polymer component and a propylene-ethylene randomly copolymerized polymer component having an intrinsic viscosity number of 5 to 7 dl/g, or is a mixture (A-3) including a propylene-based polymeric material (A-1) as defined above and a propylene homopolymer (A-2) having an intrinsic viscosity number of less than 1.5 dl/g.

The content of the propylene homopolymerized polymer component in the propylene-based polymeric material (A-1) is, from the viewpoint of achieving a good balance between the stiffness and the impact resistance of the propylene resin composition, preferably not less than 55% by weight, more preferably not less than 65% by weight, and yet more preferably not less than 70% by weight, and is preferably not more than 95% by weight, more preferably not more than 92% by weight, and yet more preferably not more than 90% by weight. The content of the propylene-ethylene randomly copolymerized polymer component is preferably not less than 5% by weight, more preferably not less than 8% by weight, and yet more preferably not less than 10% by weight, and is preferably not more than 45% by weight, more preferably not more than 35% by weight, and yet more preferably not more than 30% by weight.

The melt flow rate (MFR) of the propylene-based polymeric material (A-1) measured at 230° C. under a load of 2.16 kgf in accordance with JIS K7210 is, from the viewpoint of moldability and impact resistance, preferably not less than 10 g/10 min. and more preferably not less than 30 g/10 min., and is preferably not more than 200 g/10 min. and more preferably not more than 150 g/10 min.

The propylene-based polymeric material (A-1) is produced by a multistage polymerization including polymerization for producing the propylene homopolymerized polymer component and polymerization for producing the propylene-ethylene randomly copolymerized polymer component. In such a multistage polymerization, second-stage polymerization is carried out in the presence of a polymer component produced in a first stage. For example, when the propylene homopolymerized polymer component is produced by the first-stage polymerization, the second-stage polymerization for producing the propylene-ethylene randomly copolymerized polymer component is carried out in the presence of the propylene homopolymerized polymer component produced by the first-stage polymerization. The propylene-based polymeric material (A-1) may specifically be produced by the method described below using a polymerization catalyst.

Examples of the polymerization catalyst include a Ziegler type catalyst system, a Ziegler-Natta type catalyst system, a catalyst system including an alkylaluminoxane and a compound of a transition metal of Group 4 of the periodic table containing a cyclopentadienyl ring, a catalyst system including an organoaluminum compound, a compound of a transition metal of Group 4 of the periodic table containing a cyclopentadienyl ring, and a compound that reacts therewith to form an ionic complex, and a catalyst system formed by supporting on inorganic particles of silica, clay mineral, etc. catalyst components such as a compound of a transition metal of Group 4 of the periodic table containing a cyclopentadienyl ring, a compound that forms an ionic complex, and an organoaluminum compound and carrying out modification, and it is also possible to use a prepolymerization catalyst prepared by prepolymerizing ethylene or an α-olefin in the presence of the above catalyst systems.

Examples of the above catalyst systems include catalyst systems described in JP-A-61-218606, JP-A-5-194685, JP-A-7-216017, JP-A-9-316147, JP-A-10-212319, and JP-A-2004-182981.

Examples of the polymerization method include bulk polymerization, solution polymerization, slurry polymerization, and gas-phase polymerization. The bulk polymerization referred to here in means a method in which polymerization is carried out using as a medium an olefin that is liquid at the polymerization temperature, and solution polymerization (the same applies to slurry polymerization) means a method in which polymerization is carried out in an inactive hydrocarbon solvent such as propane, butane, isobutane, pentane, hexane, heptane, or octane. Gas-phase polymerization is a method in which a monomer in gas state is used as a medium and the monomer in the gas state is polymerized in the medium.

These polymerization methods may be carried out by a multistage method employing a system in which a plurality of polymerization reaction vessels are connected in series. From industrial and economic viewpoints, it is preferable to employ a method involving continuous gas-phase polymerization or bulk-gas-phase polymerization in which bulk polymerization and gas-phase polymerization are carried out continuously.

In addition, various conditions (polymerization temperature, polymerization pressure, monomer concentration, amount of catalyst charged, polymerization time, etc.) for the polymerization step may be determined as appropriate according to the intrinsic viscosity number and content of the propylene homopolymerized polymer component or the propylene-ethylene randomly copolymerized polymer component of the target propylene-based polymeric material (A-1).

In production of the propylene-based polymeric material (A-1), in order to remove residual solvent contained in the propylene-based polymeric material (A-1) and an oligomer, etc. that has been produced as a by-product during the production, the propylene-based polymeric material (A-1) may be dried at a temperature that is not higher than the temperature at which the propylene-based polymeric material (A-1) melts. As a drying method, for example, methods described in JP-A-55-75410 and JP-A-2-80433 can be cited.

The intrinsic viscosity number (hereinafter, denoted by HI) measured in tetralin at 135° C. of the propylene homopolymerized polymer component contained in the propylene-based polymeric material (A-1) is, from the viewpoint of flowability when the propylene resin composition melts and the toughness of a molded article formed from the propylene resin composition, preferably not less than 0.7 dl/g and more preferably not less than 0.8 dl/g, and is preferably not more than 1.3 dl/g and more preferably not more than 1.1 dl/g.

Furthermore, the molecular weight distribution (defined by the ratio (Mw/Mn) of weight-average molecular weight (Mw) relative to number-average molecular weight (Mn)) measured by gel permeation chromatography (GPC) of the propylene homopolymerized polymer component contained in the propylene-based polymeric material (A-1) is preferably not less than 3 but less than 7, and more preferably not less than 3 but less than 5.

The ratio of the weight of the propylene-derived constituent unit (also called propylene content) to the weight of the ethylene-derived constituent unit (also called ethylene content), i.e. the (propylene content/ethylene content) ratio, in the propylene-ethylene randomly copolymerized polymer component contained in the propylene-based polymeric material (A-1) is, from the viewpoint of achieving a good balance between stiffness and impact resistance, preferably 80/20 to 20/80, and more preferably 80/20 to 40/60.

The intrinsic viscosity number (hereinafter, denoted by [η]II) measured in tetralin at 135° C. of the propylene-ethylene randomly copolymerized polymer component contained in the propylene-based polymeric material (A-1) is 5 to 7 dl/g; it is preferably not less than 5.5 and preferably not more than 6.5 dl/g, and is for example 5.5 to 6.5 dl/g.

Furthermore, the ratio ([η]II/[η]I) of the intrinsic viscosity number ([η]I) of the propylene homopolymerized polymer component relative to the intrinsic viscosity number ([η]II) of the propylene-ethylene randomly copolymerized polymer component is preferably not less than 1 and more preferably not less than 2, and is preferably not more than 20, more preferably not more than 10, and yet more preferably not more than 9.

The intrinsic viscosity number (units: dl/g) in the present invention is a value measured by the method described below at a temperature of 135° C. using tetralin as a solvent.

Reduced viscosity is measured at the three concentration points of 0.1 g/dl, 0.2 g/dl, and 0.5 g/dl using an Ubbelohde type viscometer. The intrinsic viscosity number is determined by a method described in 'Kobunshi Yoeki, Kobunshi Jikkengaku 11' (Polymer Solution, Polymer Experimental 11) (1982, published by Kyoritsu Shuppan Co., Ltd.) p. 491, that is, an extrapolation method in which reduced viscosity is plotted against concentration and the concentration is extrapolated to zero.

When the propylene-based polymeric material including a propylene homopolymerized polymer component and a propylene-ethylene randomly copolymerized polymer component is a polymeric material produced by a method in which a propylene homopolymerized polymer component is obtained in a first-stage polymerization step and a propylene-ethylene randomly copolymerized polymer component is obtained in a second-stage step, procedures for measuring and calculating the contents and intrinsic viscosity numbers ([η]Total, [η]I, [η]II) of the propylene homopolymerized polymer component and the propylene-ethylene randomly copolymerized polymer component are as follows. The intrinsic viscosity number ([η]Total) is the intrinsic viscosity number of the entire polymeric material including the propylene homopolymerized polymer component and the propylene-ethylene randomly copolymerized polymer component.

From the intrinsic viscosity number ([η]I) of the propylene homopolymerized polymer component obtained in the first-stage polymerization step, the intrinsic viscosity number ([η]Total) measured by the above method of a polymeric material (this is also called a final polymer) finally obtained after the second-stage polymerization step, and the contents of the propylene homopolymerized polymer component and the propylene-ethylene randomly copolymerized polymer component contained in the final polymer, the intrinsic viscosity number [η]II of the propylene-ethylene randomly copolymerized polymer component, are calculated from the equation below.

$$[\eta]II=([\eta]Total-[\eta]I \times XI)/XII$$

[η]Total: intrinsic viscosity number (dl/g) of final polymer after second-stage polymerization step

[η]I: intrinsic viscosity number (dl/g) of polymer extracted from polymerization vessel after first-stage polymerization step XI: weight ratio of propylene homopolymerized polymer component relative to entire final polymer including propylene homopolymerized polymer component and propylene-ethylene randomly copolymerized polymer component XII: weight ratio of propylene-ethylene randomly copolymerized polymer component relative to entire final polymer including propylene homopolymerized polymer component and propylene-ethylene randomly copolymerized polymer component XI and XII are determined from the material balance at the time of polymerization.

XII mentioned above, namely, the weight ratio of the propylene-ethylene randomly copolymerized polymer component relative to the entire final polymer including a propylene homopolymerized polymer component and a propylene-ethylene randomly copolymerized polymer component may be determined by measuring the heat of crystal fusion of each of the propylene homopolymerized polymer component and the final polymer and calculating from the equation below.

$$XII=1-(\Delta Hf)T/(\Delta Hf)P$$

(ΔHf)T: heat of fusion of final polymer (cal/g)
(ΔHf)P: heat of fusion of propylene homopolymerized polymer component (cal/g)

When Component (A) used in the present invention is a mixture (A-3) including a propylene-based polymeric material (A-1) and a propylene homopolymer (A-2), the content of the propylene-based polymeric material (A-1) contained in the mixture (A-3) is preferably not less than 30% by weight and more preferably not less than 45% by weight, and is preferably not more than 99% by weight and more preferably not more than 95% by weight. The content of the propylene homopolymer (A-2) is preferably not less than 1% by weight and more preferably not less than 5% by weight, and is preferably not more than 70% by weight and more preferably not more than 55% by weight.

The intrinsic viscosity number of the propylene homopolymer (A-2) is less than 1.5 dl/g; it is preferably not less than 0.1 dl/g and more preferably not less than 0.5 dl/g, and is preferably not more than 1.2 dl/g and more preferably not more than 1.0 dl/g.

The isotactic pentad fraction of the propylene homopolymer (A-2) is preferably not less than 0.97, and more preferably not less than 0.98.

The melt flow rate (measured at 230° C. under a load of 2.16 kgf in accordance with JIS K7210) of the propylene homopolymer (A-2) is preferably not less than 10 g/10 min. and more preferably not less than 40 g/10 min., and is preferably not more than 500 g/10 min. and more preferably not more than 350 g/10 min.

As a method for producing the propylene homopolymer (A-2), a method using a catalyst system of the same type as the catalyst system used in production of the propylene-based polymeric material (A-1) can be cited, and examples of the polymerization method include bulk polymerization, solution polymerization, slurry polymerization, and gas-phase polymerization.

From the viewpoint of achieving a good balance between the stiffness and the impact resistance of a resin composition, the isotactic pentad fraction of the propylene resin (A) measured by $^{13}$C-NMR is preferably not less than 0.97, and more preferably not less than 0.98. An isotactic pentad fraction of the propylene resin (A) closer to 1 indicates that the more the propylene resin (A) is a highly crystalline polymer containing a molecular structure exhibiting higher tacticity.

Furthermore, when the propylene resin (A) is the propylene-based polymeric material (A-1), the isotactic pentad fraction of the propylene resin (A) is a value that is measured for a chain of propylene-derived constituent units in the propylene homopolymerized polymer component of the propylene-based polymeric material.

Copolymer (B) of Ethylene and α-Olefin Having not Less than 4 Carbons

The propylene resin composition includes Component (B) at 10 to 20% by weight relative to 100% by weight of the total of the weights of Component (A), Component (B), and Component (C).

Furthermore, Component (B) is a copolymer of ethylene and an α-olefin having not less than 4 carbons including a monomer unit derived from an α-olefin having 4 to 12 carbons and a monomer unit derived from ethylene, having a density 0.850 to 0.870 g/cm$^3$, and having a melt flow rate (measured at 190° C. under a load of 2.16 kgf in accordance with JIS K7210) of 0.1 to 10 g/10 min.

The melt flow rate of Component (B) measured at 190° C. under a load of 2.16 kgf in accordance with JIS K7210 is 0.1 to 10 g/10 min.; it is preferably not less than 0.2 g/10 min. and more preferably not less than 1 g/10 min., and is preferably not more than 8 g/10 min. and more preferably not more than 7 g/10 min.

The density of Component (B) is 0.850 to 0.870 g/cm$^3$; it is preferably not less than 0.855 g/cm$^3$ and more preferably not less than 0.860 g/cm$^3$, and is preferably not more than 0.870 g/cm$^3$.

The α-olefin forming Component (B) is preferably an α-olefin having 4 to 10 carbons. Specific examples include an α-olefin not having a cyclic structure, such as 1-butene, 1-pentene, 1-hexene, 4-methyl-1-pentene, 1-octene, or 1-decene and an α-olefin having a cyclic structure, such as vinylcyclohexane, and 1-butene, 1-hexene, and 1-octene are preferable.

Specific examples of Component (B) include an ethylene-1-butene copolymer, an ethylene-1-hexene copolymer, an ethylene-1-octene copolymer, an ethylene-1-decene copolymer, and an ethylene-(3-methyl-1-butene) copolymer.

The content of α-olefin-derived monomer units contained in the copolymer (B) is preferably 1 to 49% by weight, more preferably 5 to 49% by weight, and yet more preferably 10 to 49% by weight, where the weight of copolymer (B) is taken as 100% by weight.

The copolymer (B) may be produced by polymerization of monomers using a polymerization catalyst.

Examples of the polymerization catalyst include a homogeneous catalyst system represented by a metallocene catalyst and a Ziegler-Natta type catalyst system.

Examples of the homogeneous catalyst system include a catalyst system including an alkylaluminoxane and a compound of a transition metal of Group 4 of the periodic table containing a cyclopentadienyl ring, a catalyst system including an organoaluminum compound, a compound of a transition metal of Group 4 of the periodic table containing a cyclopentadienyl ring, and a compound that reacts therewith to form an ionic complex, and a catalyst system formed by supporting on inorganic particles of silica, a clay mineral, etc. catalyst components such as a compound of a transition metal of Group 4 of the periodic table containing a cyclopentadienyl ring, a compound that forms an ionic complex, and an organoaluminum compound, and further examples include a pre-polymerization catalyst system prepared by prepolymerizing ethylene or an α-olefin in the presence of the above catalyst system.

Examples of the Ziegler-Natta type catalyst system include a catalyst system combining a titanium-containing solid transition metal component and an organometallic component.

Inorganic Filler (C)

The propylene resin composition of the present invention includes an inorganic filler (C) at 18 to 28% by weight relative to 100% by weight of the total of the weights of Component (A), Component (B), and Component (C).

The inorganic filler (C) is an inorganic filler other than carbon black. Specific examples of the inorganic filler (C) include talc, mica, calcium carbonate, barium sulfate, magnesium carbonate, clay, alumina, silica, calcium sulfate, silica sand, titanium oxide, magnesium hydroxide, zeolite, molybdenum, diatomaceous earth, sericite, Shirasu sand, calcium hydroxide, calcium sulfite, sodium sulfate, bentonite, magnesium oxysulfate, potassium titanate, aluminum borate, calcium silicate, carbon fiber, glass fiber, and metal fiber. Among them, talc is preferable.

With regard to the inorganic filler (C), one type of inorganic filler may be used or two or more types of inorganic filler may be used in combination.

Furthermore, examples of the shape of the inorganic filler (C) include a powder shape, a flake shape, a granule shape, a fiber shape, etc.

The inorganic filler (C) may be used as it is, but in order to improve interfacial adhesion with Component (A) and improve dispersibility, it may be used by treating the surface with a silane coupling agent, a titanium coupling agent, or a surfactant. Examples of the surfactant include a higher fatty acid, a higher fatty acid ester, a higher fatty acid amide, and a higher fatty acid salt.

The average particle size of the inorganic filler (C) is preferably not more than 10 μm, and more preferably not more than 5 μm. The 'average particle size' referred to here in means a particle size D50 corresponding to 50% in a cumulative distribution curve determined by a laser diffraction method using a Microtrac particle size analyzer (SPA method) manufactured by NIKKISO Co., Ltd. after placing a sample in an ethanol solution and dispersing in ultrasonic cleaning equipment for 10 min.

Fatty Acid Amide (D)

The propylene resin composition of the present invention includes a fatty acid amide (D) at 0.2 to 0.7 parts by weight relative to 100 parts by weight of the total of the weights of Component (A), Component (B), and Component (C).

The fatty acid amide (D) used in the present invention is preferably a compound represented by $RCONH_2$ (in the formula, R denotes an alkyl group or alkenyl group having 5 to 21 carbons), and examples include lauramide, stearamide, oleamide, behenamide, and erucamide. Among them, erucamide is particularly preferable.

Examples of commercially available fatty acid amide products that can be used as Component (D) include Diamid Y (lauramide) produced by Nippon Kasei Chemical Co., Ltd., Armid HT-P (stearamide) produced by Lion Akzo Co., Ltd., Neutron (oleamide) produced by Nippon Fine Chemical, Diamid KN (behenamide) produced by Nippon Kasei Chemical Co., Ltd., and Neutron S (erucamide) produced by Nippon Fine Chemical.

With regard to the fatty acid amide (D), one type of fatty acid amide may be used, or two or more types of fatty acid amide may be used in combination.

Carbon Black (E)

The propylene resin composition of the present invention includes carbon black (E) at 0.8 to 2.2 parts by weight relative to 100 parts by weight of the total of the weights of Component (A), Component (B), and Component (C).

Examples of the carbon black (E) include acetylene black, furnace black, channel black, Ketjen Black, thermal black, medium thermal black, and lamp black (lampblack). Among them, furnace black and channel black, which have excellent coloring power, are preferable.

From the viewpoint of the issue of dispersibility in a resin, the average particle size of the carbon black (E) is preferably not more than 50 nm, and more preferably not more than 30 nm. It is also preferably not less than 1 nm.

Furthermore, the carbon black (E) may be one that has been subjected to a surface treatment in order to improve the dispersibility in a resin. Examples of surface treatment agents include a titanate-based surface treatment agent and an aluminum-based surface treatment agent.

Moreover, the carbon black (E) may be formulated as a master batch in which a component such as a resin and the carbon black (E) are mixed.

With regard to the carbon black (E), one type of carbon black may be used or two or more types of carbon black may be used in combination.

Propylene Resin Composition

The propylene resin composition of the present invention includes Component (A), Component (B), Component (C), Component (D), and Component (E). In one preferred embodiment, the propylene resin composition of the present invention does not contain any modified polypropylene.

The content of Component (A) in the propylene resin composition is 52 to 72% by weight relative to 100% by weight of the total of the weights of Component (A), Component (B), and Component (C); it is preferably not less than 53% by weight and more preferably not less than 54% by weight, and is preferably not more than 65% by weight.

The content of Component (B) in the propylene resin composition is 10 to 20% by weight relative to 100% by weight of the total of the weights of Component (A), Component (B), and Component (C), preferably 12 to 20% by weight, and more preferably 14 to 20% by weight.

The content of Component (C) in the propylene resin composition is 18 to 28% by weight relative to 100% by weight of the total of the weights of Component (A), Component (B), and Component (C); it is preferably not less than 21% by weight, and is preferably not more than 26% by weight.

The content of Component (D) in the propylene resin composition of the present invention is 0.2 to 0.7 parts by weight relative to 100 parts by weight of the total of the weights of Component (A), Component (B), and Component (C); from the viewpoint of the scratch resistance of a molded article it is preferably 0.3 to 0.7 parts by weight, and more preferably 0.4 to 0.7 parts by weight.

The content of Component (E) in the propylene resin composition of the present invention is 0.8 to 2.2 parts by weight relative to 100 parts by weight of the total of the weights of Component (A), Component (B), and Component (C); from the viewpoint of scratch resistance and surface gloss of a molded article it is preferably not less than 1.2 parts by weight, and is preferably not more than 2.0 parts by weight.

The melt flow rate (measured at 230° C. under a load of 2.16 kgf in accordance with JIS K7210) of the entire propylene resin composition of the present invention is, from the viewpoint of moldability, preferably not less than 0.1 g/10 min., more preferably not less than 1 g/10 min., and yet more preferably not less than 10 g/10 min., and is preferably not more than 400 g/10 min., more preferably not more than 200 g/10 min., and yet more preferably not more than 100 g/10 min. The melt flow rate of the propylene resin composition can be adjusted by appropriately changing the melt flow rate of Component (A) or Component (B).

The propylene resin composition of the present invention is obtained by melt-kneading its starting material components preferably at not less than 180° C., more preferably 180° C. to 300° C., and yet more preferably 180° C. to 250° C. Melt-kneading may employ for example a Banbury mixer, a single screw extruder, or a twin screw co-rotating extruder.

Examples of the shape of the propylene resin composition include a strand shape, a sheet shape, a plate shape, and a pellet shape formed by cutting a strand into an appropriate length. In order to mold the resin composition of the present invention, from the viewpoint of the production stability of a molded article, the shape is preferably a pellet having a length 1 to 50 mm.

With regard to the order in which the starting material components are kneaded, mixing and kneading are preferably carried out by a method such as those described below.

Method 1: a method in which all of Component (A) through Component (E) are kneaded together.

Method 2: a method in which Component (A) to Component (D) are kneaded, and a master batch of carbon black (E) is then added and kneaded.

Method 3: a method in which part of Component (A) and the carbon black (E) are kneaded in advance to form pellets, and these pellets, the rest of Component (A), and Component (B) to Component (D) are kneaded together.

Method 4: a method in which Component (A) to Component (C) are kneaded, and the fatty acid amide (D) and the carbon black (E) are then added and kneaded.

Method 5: a method in which part of Component (A), the fatty acid amide (D), and the carbon black (E) are kneaded in advance to form pellets, and these pellets, the rest of Component (A), and Component (B) and Component (C) are kneaded together.

Furthermore, when a molded article such as a film, a sheet, or an injection-molded article is produced from the propylene resin composition of the present invention, from the viewpoint of the impact resistance and the appearance of the molded article, it is preferable to suppress the occurrence of fisheyes (i.e. spot-shaped projections or indentations) on the surface of the molded article.

In order to suppress the occurrence of fisheyes, after melt-kneading the components of the resin composition, the resin composition in a molten state is preferably passed through a filter. The filter may be a single-stage filter or a multi-stage filter.

The propylene resin composition of the present invention may include a known additive. Examples of the additive include a nucleating agent, a neutralizing agent, an antioxidant, a light stabilizer, a weather stabilizer, a UV absorber, an antistatic agent, an antiblocking agent, a processing adjuvant, an organic peroxide, a colorant (an inorganic pigment, an organic pigment, a pigment dispersing agent, etc.), a foaming agent, a foam nucleating agent, a plasticizer, a flame retardant, a crosslinking agent, a crosslinking coagent, a brightness improving agent, an antimicrobial agent, and a light diffusing agent. With regard to these additives, one type may be used alone or two or more types may be used in combination.

Furthermore, the resin composition of the present invention may include a resin or a rubber in addition to Component (A) and Component (B).

Examples include a thermoplastic resin such as a styrene resin, an ABS (acrylonitrile/butadiene/styrene copolymer) resin, an AAS (special acrylic rubber/acrylonitrile/styrene copolymer) resin, an ACS (acrylonitrile/chlorinated polyethylene/styrene copolymer) resin, polychloroprene, chlorinated rubber, polyvinyl chloride, polyvinylidene chloride, an acrylic resin, an ethylene/vinyl alcohol copolymer resin, a fluorine resin, polyacetal, a phenylene ether resin, polyurethane, polyamide, an ester resin, polycarbonate, polysulfone, polyether ether ketone, polyether sulfone, or an aromatic polyester resin, an epoxy resin, a diallyl phthalate prepolymer, a silicone resin, silicone rubber, polybutadiene, 1,2-polybutadiene, polyisoprene, a styrene/butadiene copolymer, a butadiene/acrylonitrile copolymer, epichlorohydrin rubber, acrylic rubber, and natural rubber.

The molded article obtained by molding the propylene resin composition of the present invention is preferably an injection-molded article produced by an injection molding method. Examples of the injection molding method include a standard injection molding method, a foam injection molding method, a supercritical foam injection molding method, an ultra high speed injection molding method, an injection compression molding method, a gas-assist injection molding method, a sandwich molding method, a sandwich foaming molding method, and an insert/outsert molding method.

Examples of the molded article include an automobile member, a consumer electronics product member, and a container. Among them, it is suitable as an automobile interior member.

In accordance with the present invention, there can be provided a propylene resin composition useful as a material for an injection-molded article having excellent scratch resistance, low surface gloss, and suppressed occurrence of flow marks, and by injection-molding of this composition, there can be produced an injection-molded article having excellent scratch resistance and low surface gloss while suppressing the occurrence of flow marks.

EXAMPLES

The present invention is explained below by reference to Examples and Comparative Examples. The propylene polymer, the copolymer of ethylene and an α-olefin having not less than 4 carbons, the inorganic filler, and the additives used in the Examples and Comparative Examples are listed below.

(1) Propylene Resin (A)

(1-1) Propylene-Based Polymeric Material (A-1)

(BPP-1) Propylene-Based Polymeric Material

Produced by liquid-phase/gas-phase polymerization using a polymerization catalyst obtained by a method described in Example 1 of JP-A-2004-182981 under conditions that gave a propylene-based polymeric material having the physical properties below.

MFR (measured at 230° C. under a load of 2.16 kgf in accordance with JIS K7210) of propylene-based polymeric material: 60 g/10 min.
Intrinsic viscosity number ([η]Total) of propylene-based polymeric material: 1.55 dl/g
Intrinsic viscosity number ([η]I) of propylene homopolymerized polymer component: 0.89 dl/g
Content of propylene-ethylene randomly copolymerized polymer component: 12.0% by weight
Ethylene content of propylene-ethylene randomly copolymerized polymer component: 32% by weight
Intrinsic viscosity number ([η]II) of propylene-ethylene randomly copolymerized polymer component: 6.0 dl/g (BPP-2) Propylene-Based Polymeric Material
Produced by liquid-phase/gas-phase polymerization using a polymerization catalyst obtained by a method described in Example 1 of JP-A-2004-182981 under conditions that gave a propylene-based polymeric material having the physical properties below.
MFR (measured at 230° C. under a load of 2.16 kgf in accordance with JIS K7210) of propylene-based polymeric material: 32 g/10 min.
Intrinsic viscosity number ([η]Total) of propylene-based polymeric material: 1.64 dl/g
Intrinsic viscosity number ([η]I) of propylene homopolymerized polymer component: 1.00 dl/g
Content of propylene-ethylene randomly copolymerized polymer component: 16.5% by weight
Ethylene content of propylene-ethylene randomly copolymerized polymer component: 32% by weight
Intrinsic viscosity number ([η]II) of propylene-ethylene randomly copolymerized polymer component: 5.0 dl/g (BPP-3) Propylene-Based Polymeric Material
Produced by liquid-phase/gas-phase polymerization using a polymerization catalyst obtained by a method described in Example 1 of JP-A-2004-182981 under conditions that gave a propylene-based polymeric material having the physical properties below.
MFR (measured at 230° C. under a load of 2.16 kgf in accordance with JIS K7210) of propylene-based polymeric material: 38 g/10 min.
Intrinsic viscosity number ([η]Total) of propylene-based polymeric material: 1.58 dl/g
Intrinsic viscosity number ([η]I) of propylene homopolymerized polymer component: 0.91 dl/g
Content of propylene-ethylene randomly copolymerized polymer component: 21.4% by weight
Ethylene content of propylene-ethylene randomly copolymerized polymer component: 30% by weight
Intrinsic viscosity number ([η]II) of propylene-ethylene randomly copolymerized polymer component: 4.0 dl/g (1-2) Propylene-Based Polymeric Material (A-1')
(BPP-4) Propylene-Based Polymeric Material
Produced by liquid-phase/gas-phase polymerization using a polymerization catalyst obtained by a method described in Example 1 of JP-A-2004-182981 under conditions that gave a propylene-based polymeric material having the physical properties below.
MFR (measured at 230° C. under a load of 2.16 kgf in accordance with JIS K7210) of propylene-based polymeric material: 0.6 g/10 min.
Intrinsic viscosity number ([η]Total) of propylene-based polymeric material:
Intrinsic viscosity number ([η]I) of propylene homopolymerized polymer component: 2.77 dl/g
Content of propylene-ethylene randomly copolymerized polymer component: 16.0% by weight
Ethylene content of propylene-ethylene randomly copolymerized polymer component: 40% by weight
Intrinsic viscosity number ([η]II) of propylene-ethylene randomly copolymerized polymer component: 3.2 dl/g (1-3) Propylene Homopolymer (A-2)
(HPP) Propylene Homopolymer
MFR (measured at 230° C. under a load of 2.16 kgf in accordance with JIS K7210): 120 g/10 min.
Intrinsic viscosity number ([η]): 0.92 dl/g (2) Copolymer (B) of Ethylene and α-Olefin Having not Less than 4 Carbons
(R-1) Ethylene-Octene Random Copolymer
Density: 0.870 g/cm$^3$
MFR (measured at 190° C. under a load of 2.16 kgf in accordance with JIS K7210): 5 g/10 min.
α-Olefin: 1-octene (R-2) Ethylene-Butene Random Copolymer
Density: 0.865 g/cm$^3$
MFR (measured at 190° C. under a load of 2.16 kgf in accordance with JIS K7210): 5 g/10 min.
α-Olefin: 1-butene (R-3) Ethylene-Butene Random Copolymer
Density: 0.862 g/cm$^3$
MFR (measured at 190° C. under a load of 2.16 kgf in accordance with JIS K7210): 3.5 g/10 min.
α-Olefin: 1-butene (R-4) Ethylene-Butene Random Copolymer
Density: 0.860 g/cm$^3$
MFR (measured at 190° C. under a load of 2.16 kgf in accordance with JIS K7210): 0.2 g/10 min.
α-Olefin: 1-butene (3) Inorganic Filler (C)
(T-1) Talc
Average particle size (particle size $D_{50}$ corresponding to 50% in measurement by laser diffractometry): 5.6 μm
(T-2) Talc
Average particle size (particle size $D_{50}$ corresponding to 50% in measurement by laser diffractometry): 3.0 μm (4) Fatty Acid Amide (D)
Compound name: erucamide (5) Carbon Black Master Batch (E')
(E'-1)
Product name: 201B PP-RM 8Q9921 (Dainichiseika Color & Chemicals Mfg. Co., Ltd.)
Carbon black (E) content: 27.8% by weight
(E'-2)
Product name: PPM OKA210 TSOP5 201B-10K (Toyo Ink Co., Ltd.)
Carbon black (E) content: 13.2% by weight The physical properties of the starting material components and the resin compositions were measured in accordance with the methods below.

(1) Melt Flow Rate (MFR, Units: g/10 min.)
The measurement was conducted in accordance with a method defined by JIS K7210.
Propylene-based polymeric material (A-1), propylene-based polymeric material (A-1'), propylene homopolymer (A-2): measurement temperature of 230° C. and load of 2.16 kgf
Copolymer (B) of ethylene and α-olefin having not less than 4 carbons: measurement temperature of 190° C. and load of 2.16 kgf (2) Density The measurement was conducted in accordance with a method defined by ASTM D792.

(3) Intrinsic Viscosity Number ([η], Units: dl/g)

Reduced viscosity was measured at the three concentration points of 0.1 g/dl, 0.2 g/dl, and 0.5 g/dl using an Ubbelohde type viscometer. The intrinsic viscosity number was determined by an extrapolation method involving plotting reduced viscosity against concentration and extrapolating the concentration to zero.

Measurement and Calculation of Proportions and Intrinsic Viscosity Numbers ([η]Total, [η]I, [η]II) of Propylene Homopolymerized Polymer Component and Propylene-Ethylene Randomly Copolymerized Polymer Component The intrinsic viscosity number [η]II of the propylene-ethylene randomly copolymerized polymer component polymerized in the second-stage polymerization step was calculated from the equation given below using the intrinsic viscosity number ([η]I) of the propylene homopolymerized polymer component obtained in the first-stage polymerization step, the intrinsic viscosity number ([η]Total) measured by the method above of the final polymer after the second-stage step (total of propylene homopolymerized polymer component and propylene-ethylene randomly copolymerized polymer component), and the contents (weight ratios) of the propylene homopolymerized polymer component and the propylene-ethylene randomly copolymerized polymer component contained in the final polymer.

$$[\eta]II = ([\eta]Total - [\eta]I \times XI)/XII$$

[η]Total: intrinsic viscosity number (dl/g) of final polymer after second-stage polymerization step

[η]I: intrinsic viscosity number (dl/g) of polymer extracted from polymerization vessel after first-stage polymerization step XI: weight ratio of propylene homopolymerized polymer component formed in first-stage step XII: weight ratio of propylene-ethylene randomly copolymerized polymer component formed in second-stage step XII mentioned above is the weight ratio of the propylene-ethylene randomly copolymerized polymer component relative to the total of the final polymer including the propylene homopolymerized polymer component and the propylene-ethylene randomly copolymerized polymer component was calculated from the equation given below by measuring the heat of crystal fusion of each of the propylene homopolymerized polymer component and the final polymer. The heat of crystal fusion was measured by differential scanning calorimetry (DSC).

$$XII = 1 - (\Delta Hf)T/(\Delta Hf)P$$

(ΔHf)T: heat of fusion (cal/g) of final polymer (propylene-based polymeric material including propylene homopolymerized polymer component and propylene-ethylene randomly copolymerized polymer component)

(ΔHf)P: heat of fusion (cal/g) of propylene homopolymerized polymer component $$XI = 1 - XII$$

(4) Carbon Black Content (Units: % by Weight)

The carbon black content was measured using a TG/DTA-200 manufactured by Seiko Instruments Inc. in accordance with the weight loss by heating in three stages under the analytical conditions shown in Table 1 below.

TABLE 1

| | Atmosphere | Temperature range (° C.) | Rate of temperature increase (° C./min.) | Time (min.) |
|---|---|---|---|---|
| First stage | N$_2$ gas | 25 to 600 | 10 | 57.5 |
| Second stage | N$_2$ gas | 600 | 0 | 10 |
| Third stage | Air | 600 to 850 | 10 | 25 |

(5) Scratch Resistance

A plate-shaped molded article having a GrainJ textured pattern transferred to the surface was obtained by carrying out injection molding using an SE180D injection molding machine, manufactured by Sumitomo Heavy Industries, Ltd., with a mold having a cavity size of 100 mm×400 mm×3.0 mm thick (clamping force 180 ton; cavity surface textured with GrainJ) at a molding temperature of 220° C. A 100 mm square sample was cut out of the molded article thus obtained to give a measurement sample. A scratch test was carried out under the conditions given below.

Equipment used: Taber scratch tester (Toyo Seiki Co., Ltd.)
Rotational speed: 0.5 rpm
Cutter: tungsten carbide
  4.8 mm square×19 mm length, blade tip radius 12.7 mm
Orientation of cutter: mounted so that long face of cutter was up.
Load: 100 gf The scratch resistance was evaluated by visual examination. The evaluation criteria were as follows.

Scratching, whitening, and flattened grain were not observed or were observed but were inconspicuous: Good Scratching, whitening, and flattened grain were observed and were conspicuous: Poor (6) State of Occurrence of Flow Marks A plate-shaped molded article having a mirror-finished surface was obtained by carrying out injection molding using an SE180D injection molding machine, manufactured by Sumitomo Heavy Industries, Ltd., with a mold having a cavity size of 100 mm×400 mm×3.0 mm thick (clamping force 180 ton; cavity surface mirror-finished) at a molding temperature of 220° C. Flow marks were examined visually on the plate-shaped molded article thus obtained. The distance (units: mm) between the position where flow marks started to occur and the gate end face was determined. The longer the distance between the position of occurrence of flow marks and the gate end face, the less the occurrence of flow marks and the better the appearance of the molded article.

(7) Gloss (Units: %)

The 60° specular gloss of a molded article was measured in accordance with a method defined by JIS K7105.

Examples 1 to 3 and Comparative Examples 1 to 3

The mixing ratios of the propylene polymers (A-1) and (A-2), the copolymer (B) of ethylene and an α-olefin having not less than 4 carbons, and the inorganic filler (C) are shown in Table 2 below (the total of Component (A-1), Component (A-2), Component (B), and Component (C) was taken as 100% by weight). The fatty acid amide (D), the carbon black master batches (E'-1) and (E'-2), and the propylene polymer (A-1') were added at the mixing ratios shown in Table 2 relative to 100 parts by weight of the total of Component (A-1), Component (A-2), Component (B), and Component (C), and a resin composition was produced by kneading and extruding using a twin screw extruder under vent aspiration.

The physical properties of the resin compositions thus obtained are shown in Table 2 below.

TABLE 2

| | (A-1) | | | (A-2) | (B) | | | | (C) | |
|---|---|---|---|---|---|---|---|---|---|---|
| | (BPP-1) % by weight | (BPP-2) % by weight | (BPP-3) % by weight | (HPP) % by weight | (R-1) % by weight | (R-2) % by weight | (R-3) % by weight | (R-4) % by weight | (T-1) % by weight | (T-2) % by weight |
| Ex. 1 | 56.8 | — | — | 3.2 | — | 10.5 | — | 5.3 | 24.2 | — |
| Ex. 2 | 56.8 | — | — | 3.2 | 15.8 | — | — | — | 24.2 | — |
| Ex. 3 | 47.4 | — | — | 8.9 | 18.4 | — | — | — | — | 25.3 |
| Comp. Ex. 1 | 47.4 | — | — | 8.9 | 18.4 | — | — | — | — | 25.3 |
| Comp. Ex. 2 | — | 63.0 | — | 4.0 | 9.0 | — | 3.0 | — | 21.0 | — |
| Comp. Ex. 3 | — | — | 56.8 | 3.2 | 15.8 | — | — | — | 24.2 | — |

| | (A-1') (BPP-4) parts by weight | (D) parts by weight | (E) | | | Scratch resistance | Position flow marks occurred mm | Gloss % |
|---|---|---|---|---|---|---|---|---|
| | | | (E'-1) parts by weight | (E'-2) parts by weight | Carbon black parts by weight | | | |
| Ex. 1 | 5.3 | 0.42 | 6.3 | — | 1.8 | Good | 178 | 50 |
| Ex. 2 | 5.3 | 0.42 | 6.3 | — | 1.8 | Good | 208 | 58 |
| Ex. 3 | 5.3 | 0.63 | — | 10.5 | 1.4 | Good | 216 | 65 |
| Comp. Ex. 1 | 5.3 | 0.63 | — | 5.3 | 0.7 | Poor | 214 | 66 |
| Comp. Ex. 2 | — | — | 6.0 | — | 1.7 | Poor | 217 | 59 |
| Comp. Ex. 3 | 5.3 | 0.42 | 6.3 | — | 1.8 | Good | 135 | 58 |

The invention claimed is:

1. A propylene resin composition comprising
a propylene resin (A) defined below, a copolymer of ethylene and an α-olefin having not less than 4 carbons (B) defined below, an inorganic filler (C), a fatty acid amide (D), and carbon black (E), wherein
the propylene resin (A) has a content of 52% to 72% by weight, the copolymer (B) has a content of 10% to 20% by weight, and the inorganic filler (C) has a content of 18% to 28% by weight,
where the total of the weights of the propylene resin (A), the copolymer (B) of ethylene and an α-olefin having not less than 4 carbons, and the inorganic filler (C) is taken as 100% by weight, and
the fatty acid amide (D) is contained at 0.2 to 0.7 parts by weight, and the carbon black (E) is contained at 0.8 to 2.2 parts by weight, relative to 100 parts by weight of the total of the weights of the propylene resin (A), the copolymer (B), and the inorganic filler (C),
propylene resin (A) is a propylene-based polymeric material (A-1) produced by multistage polymerization and comprising a propylene homopolymerized polymer component and a propylene-ethylene randomly copolymerized polymer component having an intrinsic viscosity number of 5 to 7 dl/g, or being a mixture (A-3) comprising a propylene-based polymeric material (A-1) as defined above and a propylene homopolymer (A-2) having an intrinsic viscosity number of less than 1.5 dl/g;
copolymer (B) is a copolymer of ethylene and an α-olefin having not less than 4 carbons having a density of 0.850 to 0.870 g/cm³ and a melt flow rate, measured at 190° C. under a load of 2.16 kgf in accordance with JIS K7210, of 0.1 to 10 g/10 min.

2. The composition according to claim 1, wherein the inorganic filler (C) is talc.

3. The composition according to claim 1, wherein the fatty acid amide (D) is erucamide.

4. An injection-molded article comprising the propylene resin composition according to claim 1.

5. The composition according to claim 2, wherein the fatty acid amide (D) is erucamide.

6. An injection-molded article comprising the propylene resin composition according to claim 2.

7. An injection-molded article comprising the propylene resin composition according to claim 3.

8. An injection-molded article comprising the propylene resin composition according to claim 5.

* * * * *